(12) United States Patent
Fukami

(10) Patent No.: US 7,404,599 B2
(45) Date of Patent: Jul. 29, 2008

(54) SUNROOF APPARATUS

(75) Inventor: Kiyozumi Fukami, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/447,937

(22) Filed: Jun. 7, 2006

(65) Prior Publication Data
US 2006/0279112 A1 Dec. 14, 2006

(30) Foreign Application Priority Data
Jun. 10, 2005 (JP) ............................. 2005-170764

(51) Int. Cl.
B60J 7/22 (2006.01)
(52) U.S. Cl. ..................................... 296/217
(58) Field of Classification Search .................. 296/217
See application file for complete search history.

(56) References Cited
U.S. PATENT DOCUMENTS
4,268,085 A * 5/1981 Sakai et al. ................. 296/217

6,357,823 B1 * 3/2002 Birndorfer et al. .......... 296/217
6,695,399 B2 * 2/2004 Pfertner et al. .............. 396/217

FOREIGN PATENT DOCUMENTS
DE 3426998 * 1/1986
JP 56-17721 2/1981

* cited by examiner

Primary Examiner—Dennis H Pedder
(74) Attorney, Agent, or Firm—Finnegan, Henderson, Farabow, Garrett & Dunner, LLP

(57) ABSTRACT

A sunroof apparatus includes a pair of arms being arranged along respective sides in a vehicle width direction of an opening portion formed on a roof of a vehicle, a rear portion of the arm being pivotally connected to the roof, a front portion of the arm being biased by a first spring in a rising direction, a pair of arm holding members operating so as to follow a movement of a sunroof panel that opens or closes the opening portion, the arm holding member being in contact with the arm when the sunroof panel is closed, a wind deflector being pivotally connected to a front end of the arm, and a second spring for biasing a front edge of the wind deflector in a direction opposite to the rising direction. A rotation of the wind deflector by means of the second spring is restricted by the arm.

4 Claims, 7 Drawing Sheets

SUNROOF APPARATUS

CROSS REFERENCE TO RELATED APPLICATIONS

This application is based on and claims priority under 35 U.S.C. § 119 to Japanese Patent Application No. 2005-170764, filed on Jun. 10, 2005, the entire content of which is incorporated herein by reference.

FIELD OF THE INVENTION

This invention generally relates to a sunroof apparatus equipped with a wind deflector.

BACKGROUND

A known sunroof apparatus is disclosed in JP56-017721A. According to the sunroof apparatus disclosed, an opening portion is formed on a roof of a vehicle for the purposes of ventilation, lighting, and the like. A sunroof panel (or a lid), and a sunshade are provided at the opening portion. Further, in order to prevent undesirable airflow from coming through a front portion of the opening portion when the sunroof panel is in an open position, a wind deflector that is comprised of a panel is attached at a front end of the opening portion. The wind deflector may also be called a deflector panel. Both ends of the wind deflector in a vehicle width direction are connected by means of respective coil springs to a pair of arms having a distance therebetween and arranged along a pair of guide rails that are provided on both sides in the vehicle width direction of the opening portion respectively. Both of the arms are pivotally supported by a vehicle body at rear ends and biased in a vehicle exterior direction by means of plate springs respectively. In this configuration, when the sunroof panel moves in an open direction, the arms are released so as to move upward, thereby causing front portions of the arms to rise, i.e. to move in the vehicle exterior direction, by means of the plate springs respectively. Consequently, the wind deflector is moved to a predetermined position.

The wind deflector is secured at an operating position in such a manner that a front-edge sealing member of the wind deflector makes contact with a lower face of the roof located at a front of the opening portion.

When the sunroof panel is opened, the arms are released to move upward thereby causing the front portions to rise. The wind deflector moves from the stored position to the operating position accordingly. At this time, the front-edge sealing member of the deflector panel makes contact with the lower face of the roof. Then, the sealing member moves rearward while scraping against the lower face of the roof along with further rising of the front portions of the arms. Then, rising of the front portions of the arms (i.e. a rotation relative to a pivot point of each arm) are stopped and thus sliding of the sealing member relative to the lower face of the roof is also stopped. The operating position of the wind deflector is ensured accordingly.

According to the aforementioned structure, sealing structure between the sunroof panel and the front portion of the opening portion is limited (for example, a flange cannot be formed at the front of the opening portion) when the sunroof panel is in a closed state, which results in small flexibility of designing of the sealing structure.

Thus, a need exists for a sunroof apparatus that can achieve a flexible designing of a sealing structure. The present invention has been made in view of the above circumstances and provides such an apparatus.

SUMMARY OF THE INVENTION

According to an aspect of the present invention, a sunroof apparatus includes a pair of arms being arranged along respective sides in a vehicle width direction of an opening portion formed on a roof of a vehicle, a rear portion of the arm being pivotally connected to the roof, a front portion of the arm being biased by a first spring in a rising direction, a pair of arm holding members operating so as to follow a movement of a sunroof panel that opens or closes the opening portion, the arm holding member being in contact with the arm when the sunroof panel is closed, a wind deflector being pivotally connected to a front end of the arm, and a second spring for biasing a front edge of the wind deflector in a direction opposite to the rising direction. A rotation of the wind deflector by means of the second spring is restricted by the arm.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
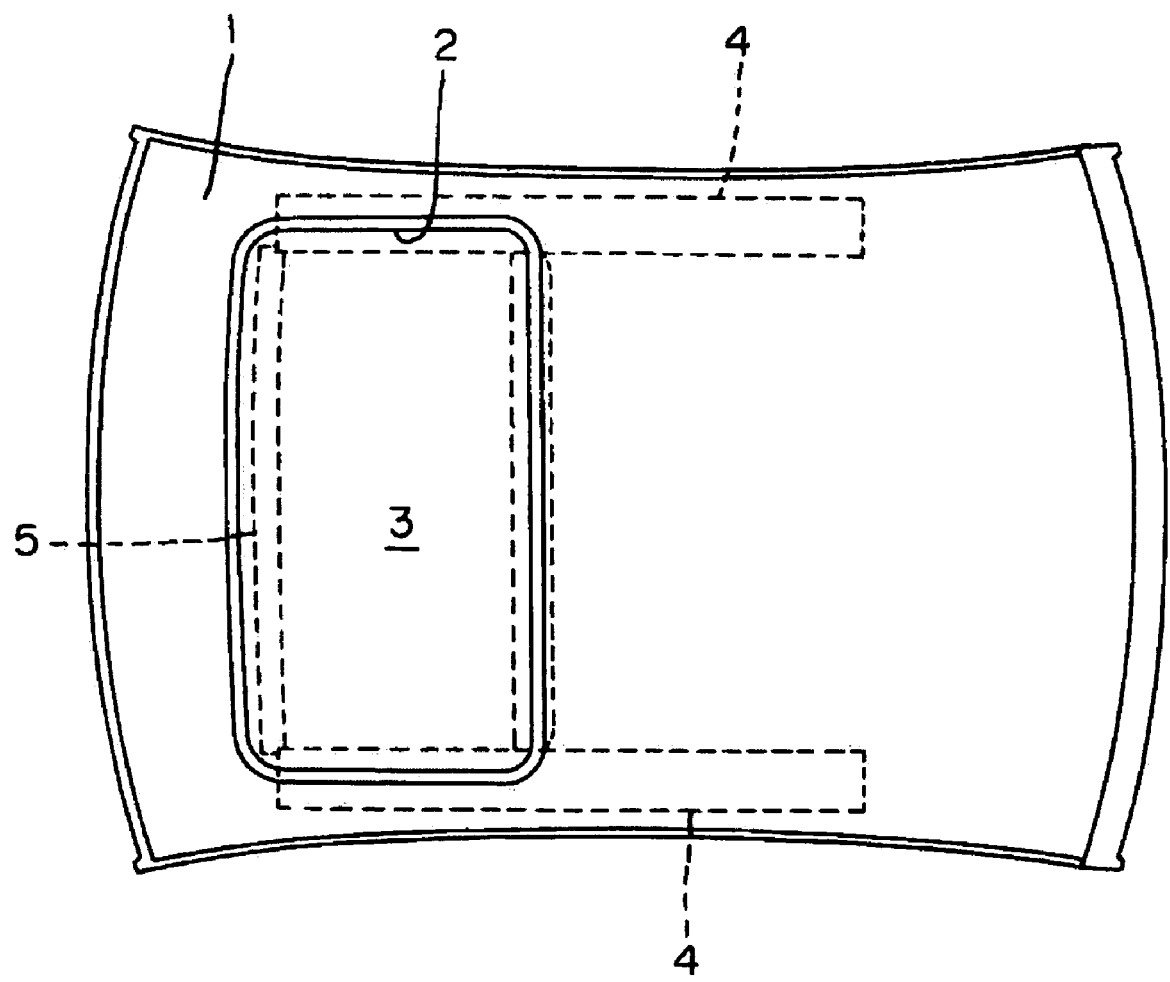
FIG. 1 is a top view of a roof of a vehicle.

An embodiment of the present invention is explained with reference to the attached drawings. As shown in FIG. 1, a sunroof panel 3 is arranged on a roof 1 of a vehicle so as to close or open an opening portion 2 formed on the roof 1. The sunroof panel 3 is slidable in a vehicle longitudinal direction along a pair of guide rails 4 formed on respective sides in a vehicle width direction of the roof 1. A wind deflector 5 is attached to a front edge of the opening portion 2. The sunroof apparatus according to the present embodiment can also be applied to a T-bar roof, a targa top type roof, or the like equipped with a wind deflector.

Figure 2:
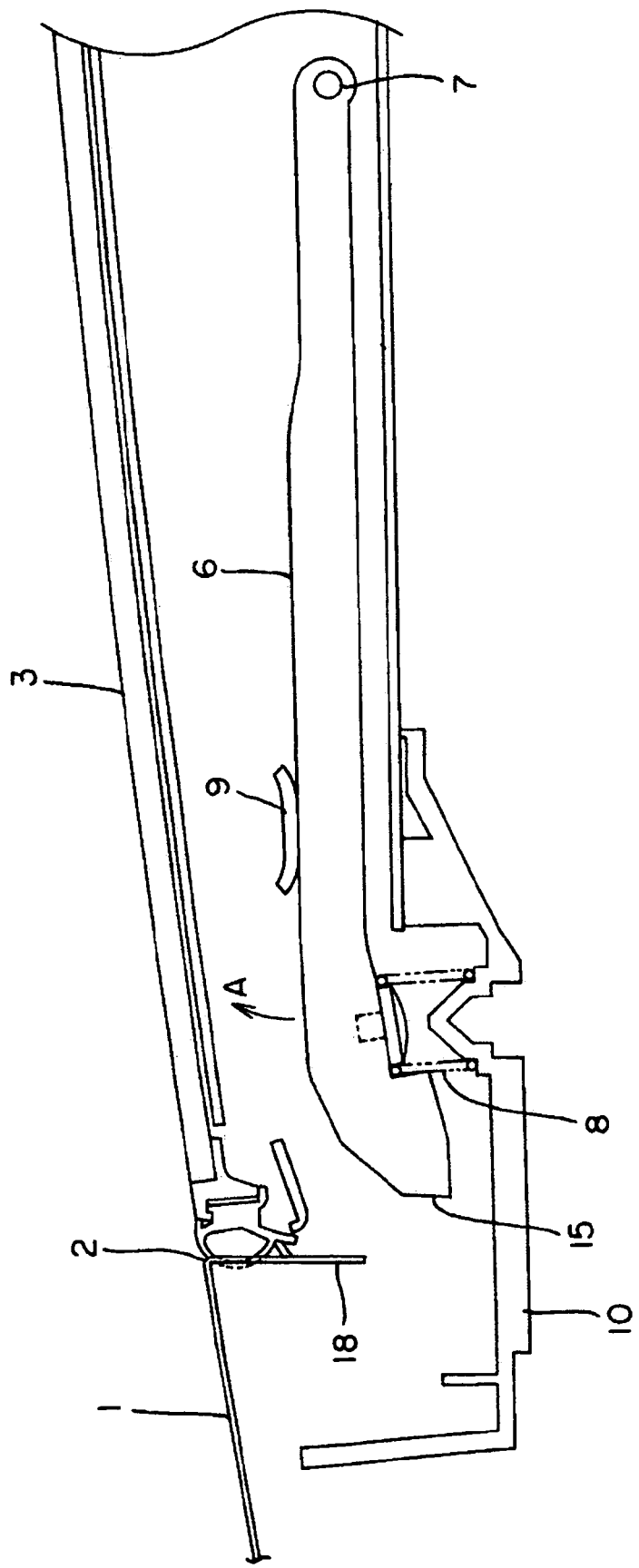
FIG. 2 is a front view of an arm and a first spring.

A pair of arms 6 are provided along the guide rails 4, formed on both of the sides of the opening portion 2 respectively. In FIG. 2, only one of the pair of arms 6 is shown. Each arm 6 is biased to rotate in an arrow A direction in FIG. 2 by means of a first spring 8 relative to a supporting point 7. The arm 6 is retained in a stored position as shown in FIG. 2 by means of an arm holding member 9 that is movable in a rearward direction of a vehicle along with the sunroof panel 3. The first spring 8 is seated on a housing 10 of a vehicle interior so as to bias the arm 6 in the arrow A direction.

Figure 3:
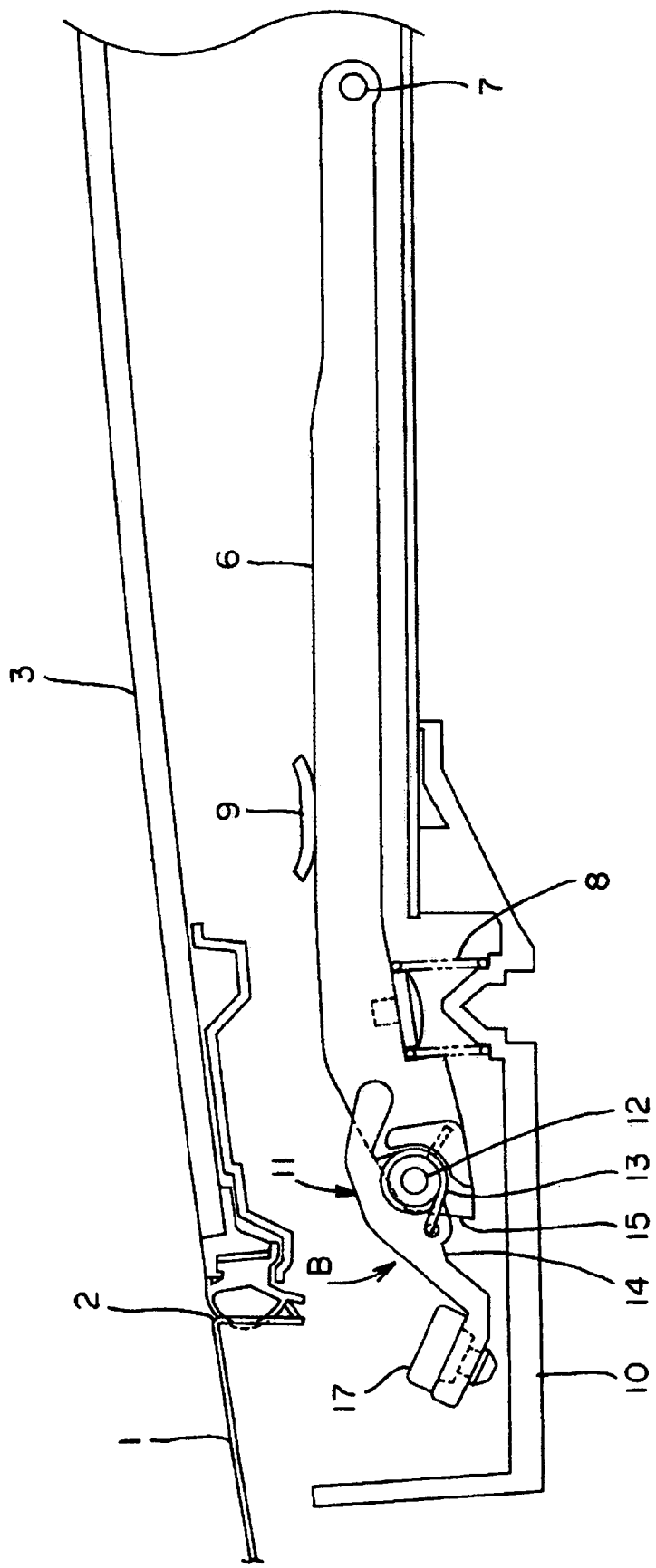
FIG. 3 is a front view showing a state of a connector connected to the arm when a wind deflector is in a stored position.
Figure 4:
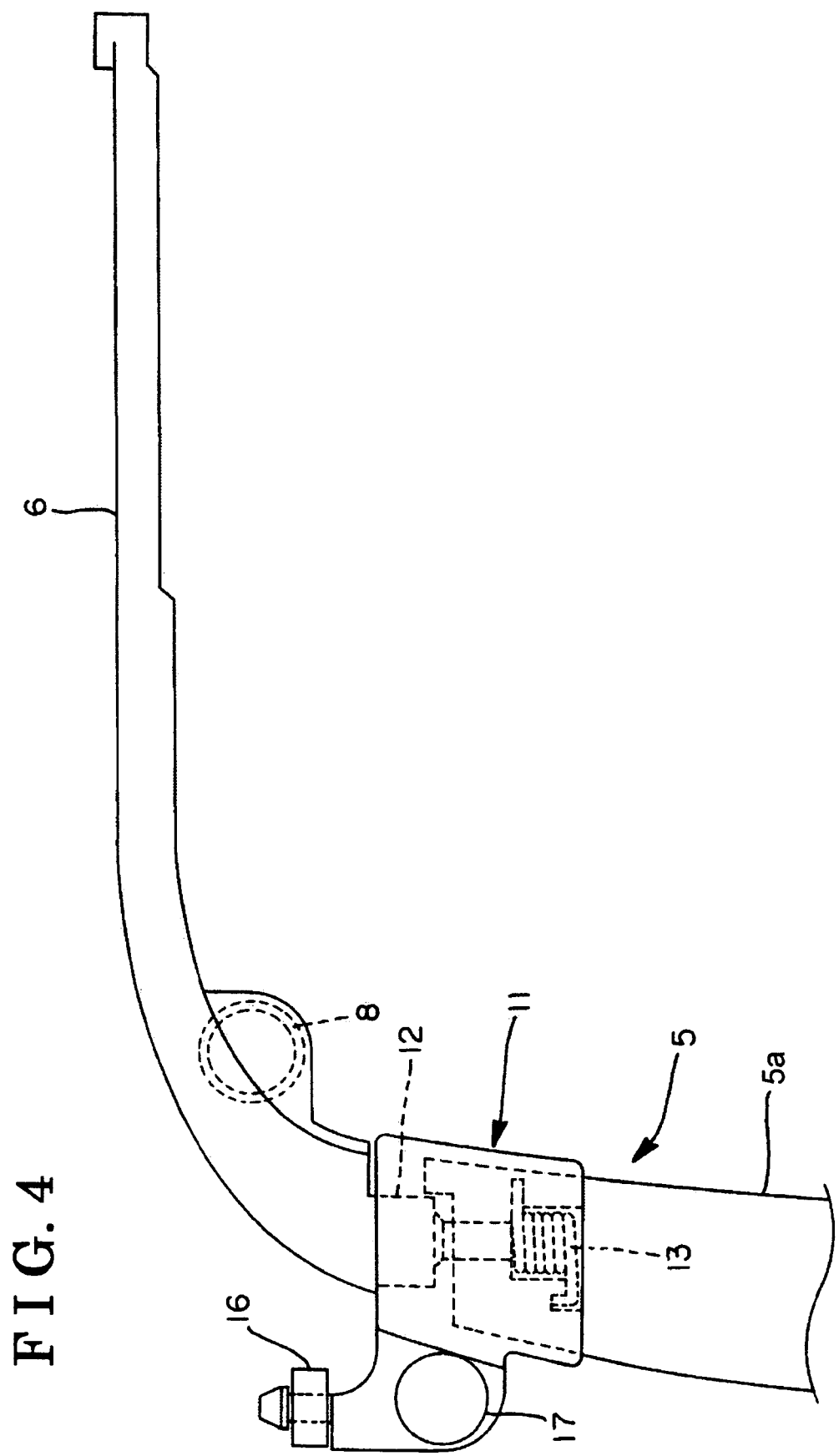
FIG. 4 is a top view of FIG. 3.

As shown in FIGS. 3 and 4, both edge portions in a vehicle width direction of a deflector panel 5a are connected to front edge portions of the arms 6 by means of connectors 11, respectively. The wind deflector 5 includes those connectors 11. Each connector 11 and each arm 6 are relatively rotatable towards each other by means of a shaft portion of the arm 6.

The deflector panel 5a is integrally connected to the connectors 11 to thereby constitute the wind deflector 5. A second spring 13 wound around a shaft portion 12 biases the connector 11 and the deflector panel 5a, i.e. the wind deflector 5, in an arrow B direction shown in FIG. 3. A contact face 14 of the connector 11 faces a stopper face 15 of the arm 6. As shown in FIG. 4, the connector 11 includes a roller 16 at a front end and a circular base portion 17 on an inner side thereof.

Figure 5:
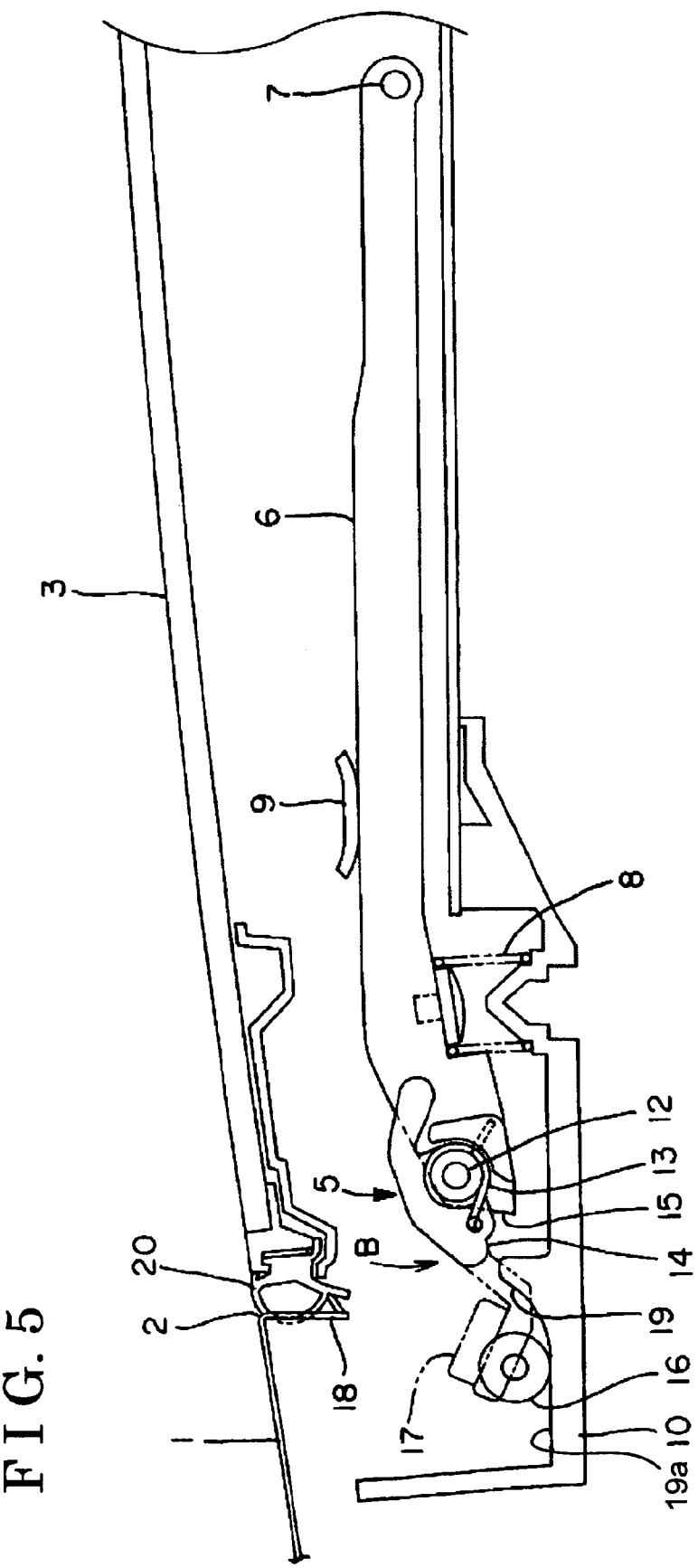
FIG. 5 is a front view showing a relationship between a roller of the connector and a housing.

FIG. 5 shows a stored state of the wind deflector 5. When the sunroof panel 3 is fully closed, the arm 6 that moves forward or rearward along with the sunroof panel 3 is retained in a position shown in FIG. 5, i.e. a stored position, by means of the arm holding member 9 against a biasing force of the first spring 8. The second spring 13 biases the wind deflector 5 in the arrow B direction so that the roller 16 is slidably in contact with an inner wall face of the housing 10. When the sunroof panel 3 is fully closed, a sealing member 20 formed on the sunroof panel 3 makes elastically contact with a flange 18 formed on a front edge of the opening portion 2 so as to ensure sealability. An inclined face 19 (tapered face) is formed on the inner wall face of the housing 10 on a lower side of the flange 18. The inclined face 19 enables sliding of the roller 16 thereon and assists the base portion 17 in facing the flange 18.

Figure 6:
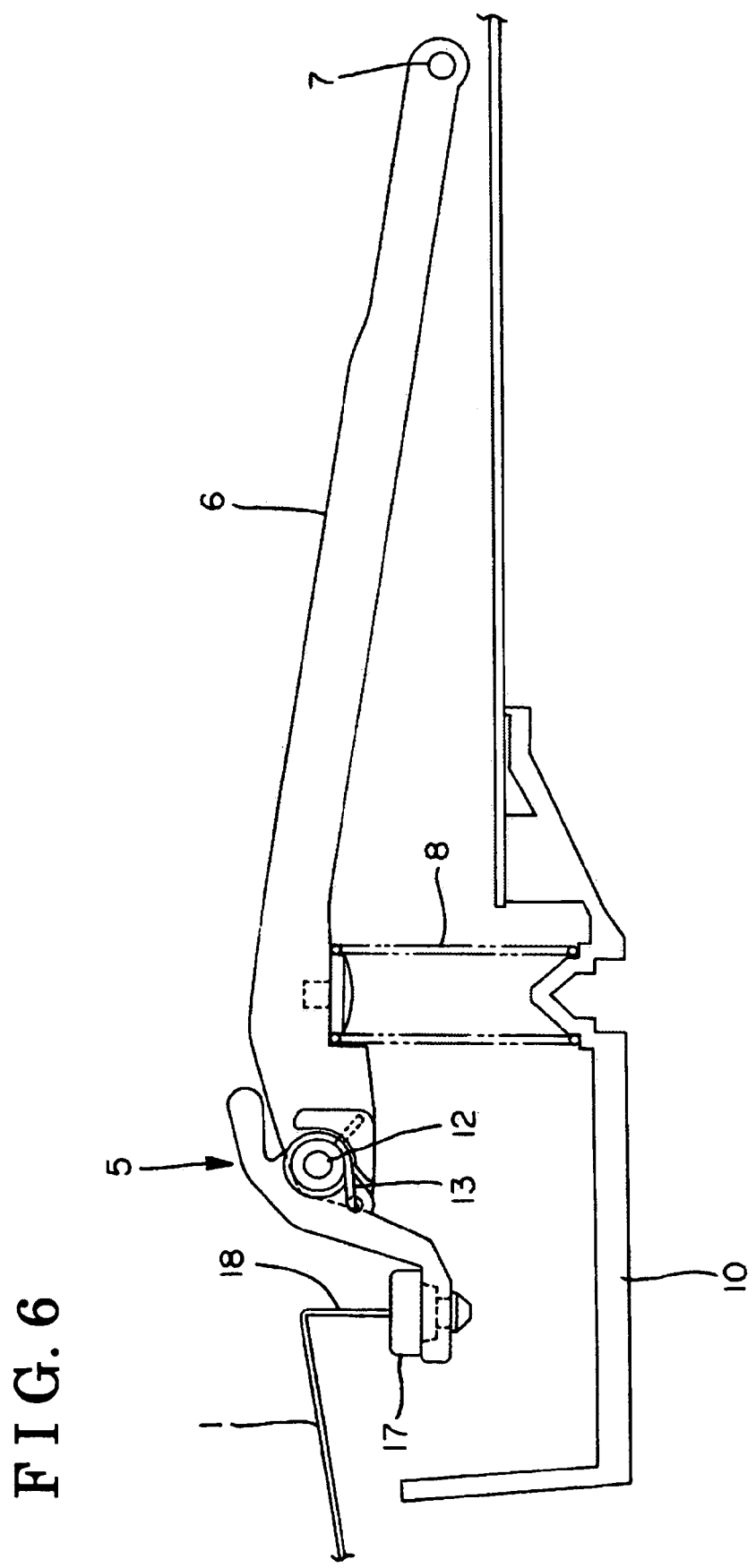
FIG. 6 is a front view showing a state in which the wind deflector is in an operating position.

When the sunroof panel 3 moves rearward from a state shown in FIG. 5, i.e. the sunroof panel 3 is opening, the arm holding member 9 moves rearward along with the sunroof panel 3. Then, the first spring 8 brings the arm 6 to rise as shown in FIG. 6. At this time, since the second spring 13 biases the wind deflector 5 in the arrow B direction, the roller 16 moves rearward on the inner wall face of the housing 10 and climbs on the inclined face 19. Then, the base portion 17 faces the flange 18 while the contact face 14 of the connector 11 makes contact with the stopper face 15 of the arm 6. The rotation of the connector 11 and the deflector panel 5a, i.e. the wind deflector 5, in a counterclockwise direction shown in FIG. 5 is stopped accordingly. Then, the base portion 17 makes contact with a lower end of the flange 18 while keeping a state shown in FIG. 6 so that the operating position of the wind deflector 5 is ensured. At this time, the base portion 17 is prevented from moving rearward and thus scraping of the base portion 17 against the flange 18 can be avoided.

Figure 7:
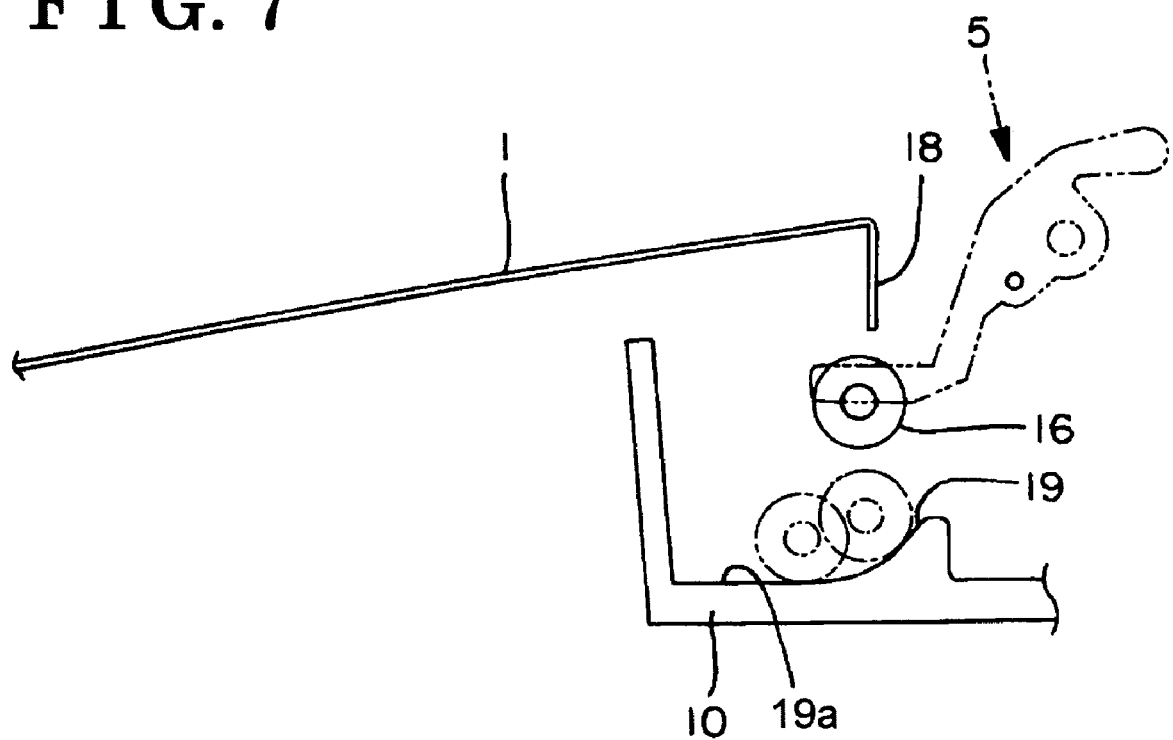
FIG. 7 is a front view showing a movement of the roller when the wind deflector is moved from the operating position to the stored position.

When the sunroof panel 3 is closed from the operating state of the wind deflector 5, as shown in FIG. 6, the arm holding member 9 pushes down the arm 6 to make a state shown in FIG. 5. When the wind deflector 5 is lowered from the operating position as shown in FIG. 7, the roller 16 makes contact with the inclined face 19 and then moves forward along the inclined face 19 (i.e. to a flat face 19a). This movement of the roller 16 prevents the roller 16 to bump against the inner wall face of the housing 10 and assures smooth movement of the roller 16. In the state shown in FIG. 6, the contact between the flange 18 and the base portion 17 is independent of the biasing force of the second spring 13 and only receives the biasing force of the first spring 8.

According to the aforementioned embodiment, the connector 11 for connecting the wind deflector 5 to the arm 6 (or the deflector panel 5a) makes contact with the stopper face 15 formed on the arm 6 so that a rotation of the connector 11 (i.e., a rotation of the deflector panel 5a relative to the arm 6) is avoided. Accordingly, a slidable contact of the deflector panel 5a to the lower face of the roof 1 is prevented, which may enhance flexibility in designing of sealing such as the flange 18, formed on the opening portion 2, and the sealing member 20, formed on the sunroof panel 3.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus, comprising:
   a pair of arms being arranged along respective sides in a vehicle width direction of an opening portion formed on a roof of a vehicle, a rear portion of each arm being pivotally connected to the roof, a front portion of each arm being biased by a first spring in a rising direction;
   a pair of arm holding members configured to follow a movement of a sunroof panel that opens or closes the opening portion, each arm holding member being in contact with a respective arm when the sunroof panel is closed;
   a wind deflector pivotally connected to a front end of each arm; and
   a second spring for biasing a front edge of the wind deflector in a direction opposite to the rising direction; wherein a rotation of the wind deflector by means of the second spring is restricted by the arms; and
   wherein the wind deflector includes a connector by means of which the respective arm and a deflector panel are connected to each other, and with which a stopper face formed on a front end of the respective arm makes contact for restricting a rotation of the wind deflector relative to the respective arm; and
   wherein the connector includes a roller which slides on a tapered face to a flat face of a housing when the wind deflector moves to a stored position.

2. A sunroof apparatus according to claim 1, wherein the connector includes a base portion that makes contact with a lower edge of a flange formed on a front edge of the opening portion.

3. A sunroof apparatus according to claim 2, wherein the tapered face is positioned on a lower side of the flange.

4. A sunroof apparatus comprising:
   a guide rail slidably mounting a sunroof;
   an arm provided along the guide rail on a side of the sunroof, said arm comprising a stopper face, a first spring biasing said arm to pivot upward and in a first direction when the sunroof opens;
   a wind deflector at a forward end of said sunroof, said wind deflector comprising a roller, a contact face, and a second spring biasing said wind deflector to pivot upward and in a second direction opposite said first direction when the sunroof opens; and
   a housing seating the first spring and comprising an inclined face;
   wherein upon opening the sunroof, said arm is biased to pivot upward and in the first direction, said roller moves on said inclined face, while said wind deflector is biased to pivot upward and in the opposite second direction, until said contact face contacts said stopper face, thereby arresting movement of the wind deflector.

* * * * *